United States Patent
Bickford et al.

(10) Patent No.: US 9,569,571 B1
(45) Date of Patent: Feb. 14, 2017

(54) METHOD AND SYSTEM FOR TIMING VIOLATIONS IN A CIRCUIT

(71) Applicant: INTERNATIONAL BUSINESS MACHINES CORPORATION, Armonk, NY (US)

(72) Inventors: Jeanne P. Bickford, Essex Junction, VT (US); Eric A. Foreman, Fairfax, VT (US); Kerim Kalafala, Rhinebeck, NY (US); Sudeep Mandal, Bangalore (IN); Shashank B. Sreekanta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/964,658

(22) Filed: Dec. 10, 2015

(51) Int. Cl.
*G06F 17/50* (2006.01)

(52) U.S. Cl.
CPC .................. *G06F 17/5031* (2013.01)

(58) Field of Classification Search
CPC .................. G06F 17/5031; G06F 2217/84
USPC ......................................................... 716/108
See application file for complete search history.

(56) References Cited

U.S. PATENT DOCUMENTS

| | | | |
|---|---|---|---|
| 6,133,751 A | 10/2000 | Churcher et al. | |
| 7,049,845 B1 | 5/2006 | Chan | |
| 7,312,631 B1 | 12/2007 | Bauer et al. | |
| 8,228,106 B2 | 7/2012 | Baumann et al. | |
| 2005/0114811 A1* | 5/2005 | Schultz | 716/6 |
| 2006/0112360 A1* | 5/2006 | Okudaira | 716/6 |
| 2006/0119397 A1* | 6/2006 | Ferraiolo et al. | 327/31 |
| 2007/0234254 A1* | 10/2007 | Yoshimura | 716/6 |
| 2007/0236249 A1 | 10/2007 | Wong | |
| 2008/0129357 A1 | 6/2008 | Chlipala et al. | |
| 2008/0174353 A1* | 7/2008 | Badar et al. | 327/276 |
| 2009/0007041 A1 | 1/2009 | Miyagawa | |
| 2009/0222780 A1* | 9/2009 | Smith | 716/6 |

(Continued)

FOREIGN PATENT DOCUMENTS

| | | |
|---|---|---|
| EP | 0443302 A2 | 12/1990 |
| WO | 2007052091 A1 | 5/2007 |

OTHER PUBLICATIONS

Kuzishchin et al.; A Procedure for Tuning Automatic Controllers with Determining a Second-Order Plant Model with Time Delay from Two Points of a Complex Frequency Response; ISSN 0040-6015, Thermal Engineering, 2012, vol. 59, No. 10, pp. 779-786.

(Continued)

*Primary Examiner* — Suchin Parihar
(74) *Attorney, Agent, or Firm* — Cantor Colburn LLP; Bryan Bortnick

(57) ABSTRACT

A method for controlling a circuit, the method comprises performing a first timing analysis of an digital integrated design, identifying a critical path in the digital integrated design that is dependent on a parameter, modifying the digital integrated design by inserting a first delay inducing circuit, running a second timing analysis on the modified digital integrated design to determine whether a delay induced by the first delay inducing circuit meets a timing requirement of the digital integrated design, and saving the delay induced by the first delay inducing circuit with an association to the parameter in a timing library responsive to determining that the delay induced by the first delay inducing circuit meets the timing requirement of the digital integrated design.

11 Claims, 4 Drawing Sheets

(56) References Cited

U.S. PATENT DOCUMENTS

2010/0042955 A1* 2/2010 Kotecha et al. .................. 716/2
2010/0090738 A1   4/2010 Changchein et al.
2012/0268184 A1  10/2012 Baumann et al.
2014/0040844 A1* 2/2014 Visweswariah et al. ..... 716/113

OTHER PUBLICATIONS

Tadesse et al; AutoRex: An Automated Post-Silicon Clock Tuning Tool; Brown University, Division of Engineering, Providence, RI 02912 Intel Corporation, Hudson, MA 01749; 2009 IEEE; 10 pages.

* cited by examiner

METHOD AND SYSTEM FOR TIMING VIOLATIONS IN A CIRCUIT

BACKGROUND

The present invention relates to integrated circuit design, and more specifically, to timing delays in circuit design.

External and internal parameters can result in timing violations and subsequent chip failure in integrated circuit chips. Temperature spikes, voltage fluctuations, and stress variations can influence the performance of integrated circuit chips, and often cause undesirable timing violations.

SUMMARY

According to an embodiment of the present invention, a method for controlling a circuit, the method comprises performing a first timing analysis of an digital integrated design, identifying a critical path in the digital integrated design that is dependent on a parameter, modifying the digital integrated design by inserting a first delay inducing circuit, running a second timing analysis on the modified digital integrated design to determine whether a delay induced by the first delay inducing circuit meets a timing requirement of the digital integrated design, and saving the delay induced by the first delay inducing circuit with an association to the parameter in a timing library responsive to determining that the delay induced by the first delay inducing circuit meets the timing requirement of the digital integrated design.

According to another embodiment of the present invention, a method for controlling a circuit comprises monitoring an external parameter of the circuit, determining whether the monitored external parameter exceeds a threshold level, retrieving a first delay corresponding to the monitored external parameter from a timing library responsive to determining that the monitored external parameter exceeds the threshold level, and controlling a delay circuit arranged in a timing path of the circuit to induce the first delay in the timing path.

According to yet another embodiment of the present invention, a computer program product comprising a computer readable storage medium having program instructions embodied therewith, the program instructions executable by a processor to cause the processor to perform a method that comprises performing a first timing analysis of an integrated digital design, identifying a critical path in the digital integrated design that is dependent on a parameter, modifying the digital integrated design by inserting a first delay inducing circuit, running a second timing analysis on the modified digital integrated design to determine whether a delay induced by the first delay inducing circuit meets a timing requirement of the digital integrated design, and saving the delay induced by the first delay inducing circuit with an association to the first parameter condition corner in the timing library responsive to determining that the delay induced by the first delay inducing circuit meets a timing requirement of the digital integrated design.

DETAILED DESCRIPTION

It is often difficult to rectify timing violations in integrated circuit chips. The timing violations may be caused by internal or external parameters that influence the timing of data processing in the circuits.

The methods and embodiments described herein offer a way to control one or more delay circuits inserted in critical timing paths that actively induce one or more delays into a circuit as a function of the external parameters that may influence the timing during chip operation.

Figure 1:
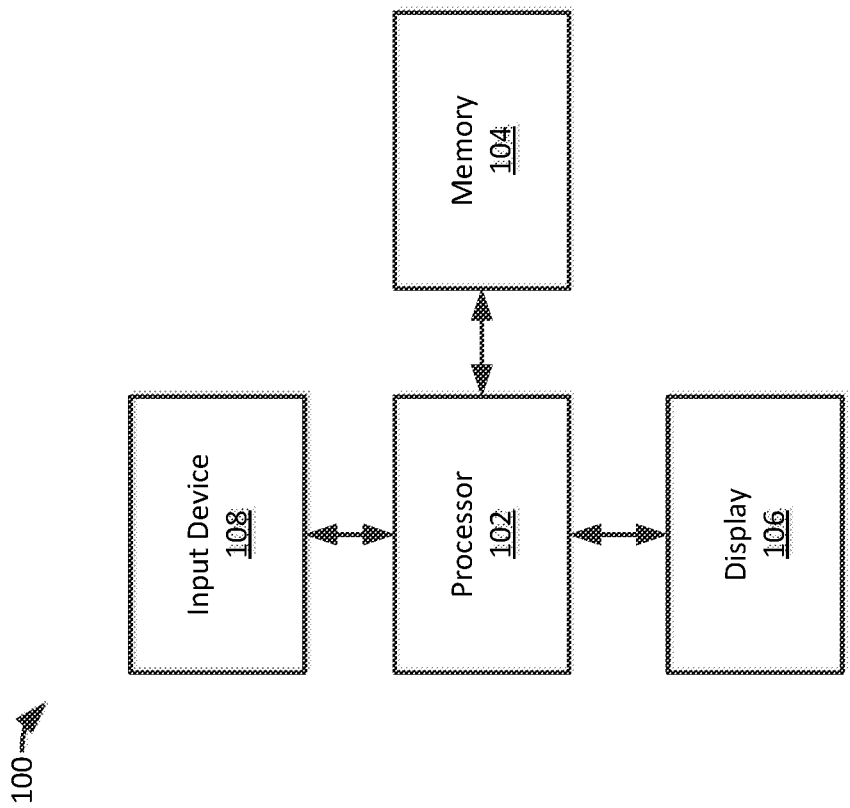
FIG. 1 illustrates a block diagram of an exemplary embodiment of a processing system.

FIG. 1 illustrates a block diagram of an exemplary embodiment of a processing system 100. The system 100 includes a processor 102 that is communicatively connected to a memory 104, a display 106, and an input device 108. In this regard, portions of the methods and systems described below may be performed on the system 100.

Figure 2:
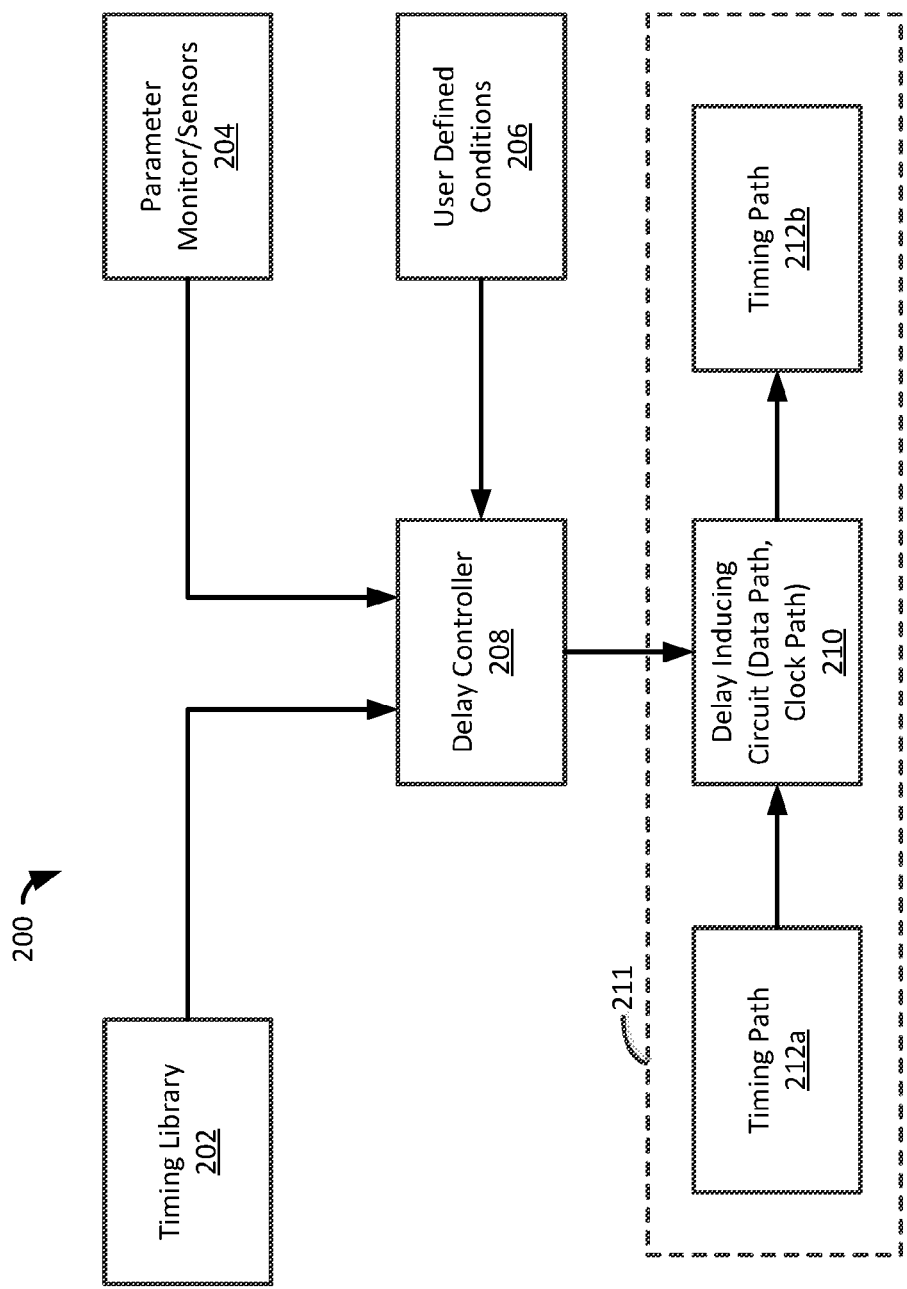
FIG. 2 illustrates a block diagram of an exemplary embodiment of a system that includes a timing library.

FIG. 2 illustrates a block diagram of an exemplary embodiment of a system 200 that includes a timing library 200 that may be stored in a memory and parameter monitor/sensors 204 that may be arranged on an integrated circuit chip. A delay controller 208 is communicatively connected to the timing library 202 and the parameter monitor/sensors 204 such that the delay controller 208 may receive inputs from the timing library 202 and the parameter monitor/sensors 204. The delay controller 208 may also receive inputs from a user, which are shown as user defined conditions 206. The delay controller 208 is operative to perform logic to control a delay inducting circuit 210. In short, the delay controller 208 controls the delay induced by the delay inducing circuit(s) 210. In turn, the delay inducing circuit 210 induces a delay in the timing path (shown in two portions) 212a and 212b such that a delay induced by the delay inducing circuit 210 on the timing path 212a results in a delay in the portion of the timing path 212b, which is arranged after the delay inducing circuit 210. The timing path 212a and 212b and the delay inducing circuit 210 comprise portions of an integrated circuit 211 that performs, for example, logic and processing operations.

Figure 3:
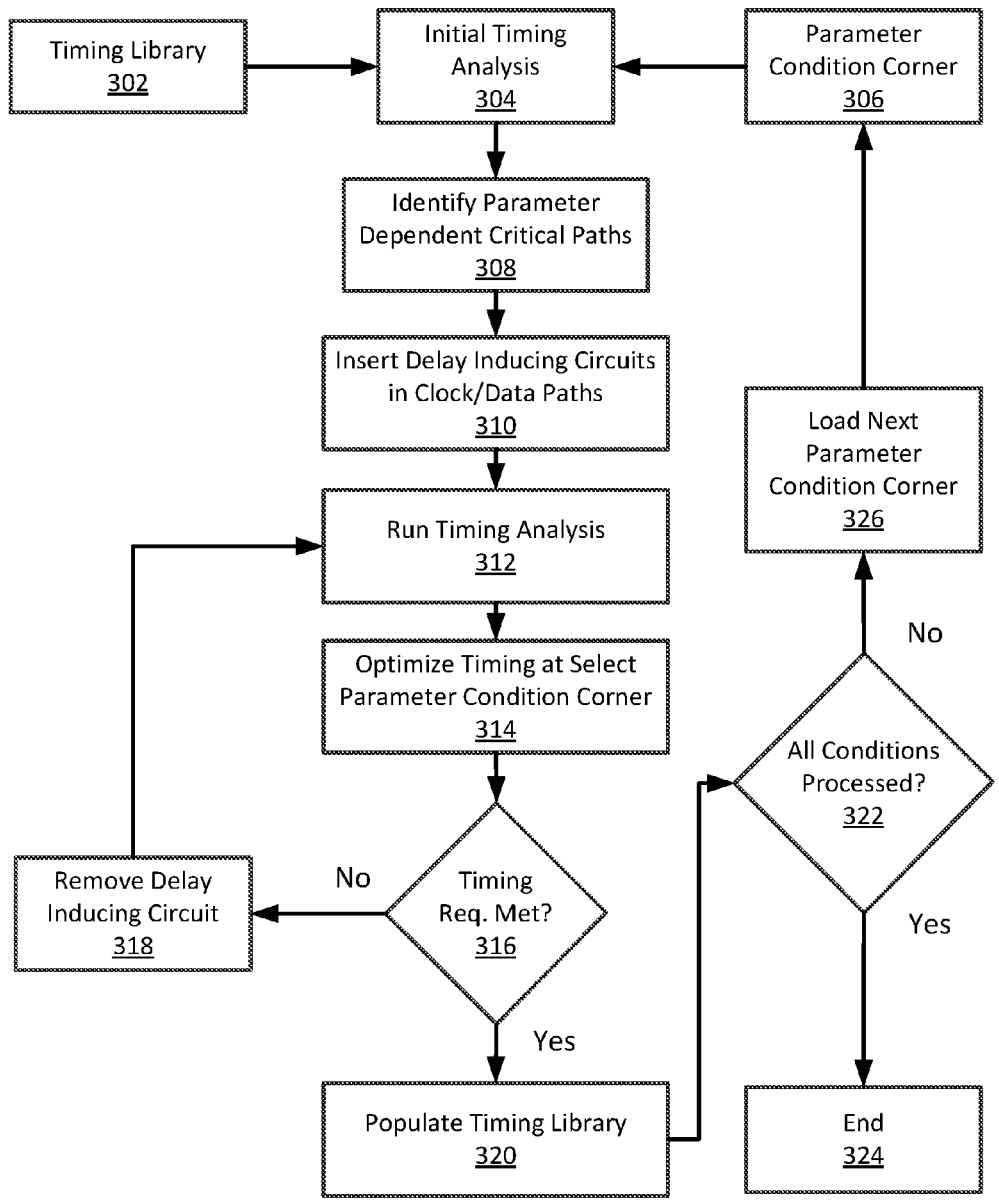
FIG. 3 illustrates a flow diagram of the logic and processes used to populate the timing library.

FIG. 3 illustrates a flow diagram of the logic and processes used to populate the timing library 202 (of FIG. 2). The timing library 202 includes, for example, a table or other similar data arrangement with associations between parameters such as, process, voltage, temperature (PVT) parameters that may influence the timing of the logic processes performed by an integrated circuit. For example, an increase in temperature may undesirably cause a timing violation in the integrated circuit. Thus, the timing library may be populated with a table that includes a particular delay to induce in a particular circuit in the timing path with respect to a temperature sensed by the parameter monitor/sensors 204.

Once the timing library 202 is populated, the integrated circuit may be manufactured, and the timing library and the parameter monitor/sensors 204 may be used as inputs to the delay controller 208 to control the delay inducting circuit. In this regard, timing violations may be mitigated by sensing a PVT parameter, retrieving a delay corresponding to the monitored PVT parameter from the timing library 202 and controlling the delay inducing circuit 210 by inducing a delay corresponding to the retrieved delay from the timing library 202 that corresponds to the monitored PVT parameter.

Referring again to FIG. 3, the method described in FIG. 3 may be performed, for example, using the processing system 100 that may include a simulation of an integrated circuit prior to production of the integrated circuit. The method of FIG. 3 is used to determine where a delay inducing circuit(s) should be fabricated in an integrated circuit, and is operative to populate the timing library 202 (of FIG. 2) with associations between delays induced in the timing paths with parameter conditions.

In block 304, an initial timing analysis is performed on the circuit. The initial timing analysis may be any of single corner timing, multi-corner timing, or statistical timing. In block 308, the parameter dependent critical paths are determined. In one embodiment, statistical sensitivity signatures are used to identify paths with large sensitivity to a parameter of interest (e.g., temperature). This can be determined, for example, by inspecting a first order canonical model, which is the output of a statistical timing analysis. In block 310, a delay inducing circuit is inserted into the simulated circuit in critical clock and data paths. In block 312 a timing analysis is performed. The timing analysis analyzes the operation of the circuit at the present parameter condition corner (e.g., voltage x). In block 314, the timing is optimized at the present (selected) parameter condition corner. In this regard, Once parameter-sensitive critical paths are determined, an optimization step is executed which involves determining a minimum and/or maximum timing delay that may be induced by a parameter sensing and delay inducing circuit, and inserting at least one such circuit within the design in order to reduce the likelihood of a timing violation. For example, in the case of a setup test, if it is determined by the initial statistical timing analysis that the slack worsens in response to increasing temperature (i.e., setup slack has a negative sensitivity to temperature), then in accordance with an exemplary embodiment, a temperature-sensing delay inducing circuit may be inserted, whose delay is programmed to increase as a function of temperature, within the clock network feeding said setup test. The insertion of said circuit within the clock path will cause the capturing clock signal to delay as temperature increases, thus reducing the negative sensitivity of setup slack to temperature.

Following the optimization, in block 316, the processor 102 (of FIG. 1) determines whether the timing requirements have been met by the delays that were tested during the optimization process in block 314. If no, the delay inducing circuit is removed in block 318 (since the delay inducing circuit with the optimized delays does not result in the timing requirements at the present parameter condition corner being met). If yes, in block 320 the timing library 302 is populated with the proper (optimized) delay that is associated with the present parameter condition corner (e.g., voltage x).

In block 322 the processor 102 (of FIG. 1) determines whether all process conditions have been processed. If yes, the process ends in block 324. If no, in block 326 the next parameter condition corner is loaded (e.g., voltage y). The next parameter condition corner is loaded in block 306 and used in the next initial timing analysis in block 304. Thus, the timing library may be populated with delays corresponding to particular parameter conditions. The delays may be used to induce a delay in particular delay inducing circuits when a particular parameter is sensed.

Figure 4:
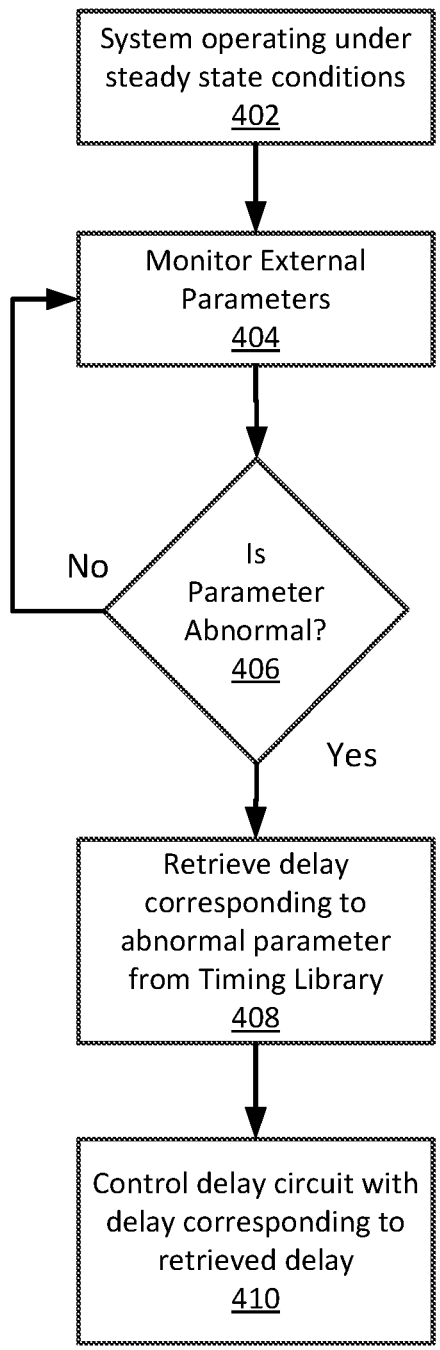
FIG. 4 illustrates a flow diagram of an exemplary embodiment of the operation of the system of FIG. 2.

FIG. 4 illustrates a flow diagram of an exemplary embodiment of the operation of the system 200 (of FIG. 2). Referring to FIG. 4, in block 402 the system is operating under steady state conditions. In block 404 the parameter monitor/sensors monitors the system operating parameters (e.g., external or internal parameters such as, for example PVT parameters). In block 406, if the parameters are abnormal (e.g., above or below a threshold level, or exceed a threshold level), the delay controller 208 of the system 200 retrieves a delay corresponding to the abnormal parameter from the timing library 202 in block 408. In block 410, the delay controller 208 controls the delay inducing circuit 210 to control the delay inducing circuit to induce a delay corresponding to the delay retrieved from the timing library 202. Inducing the delay should be operative to avoid timing violations caused by the abnormal parameter.

The embodiments described herein provide a method and system for populating a timing library that stores PVT parameters that may cause timing violations in a circuit with corresponding delays. The delays may be induced in a circuit to mitigate the timing violations. The method provides a method for using a timing library to mitigate timing violations in a circuit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling a circuit, the method comprising:
   performing a first timing analysis of an digital integrated design;
   identifying a critical path in the digital integrated design that is dependent on a parameter;
   modifying the digital integrated design by inserting a first delay inducing circuit;
   running a second timing analysis on the modified digital integrated design to determine whether a delay induced by the first delay inducing circuit meets a timing requirement of the digital integrated design;
   saving the delay induced by the first delay inducing circuit with an association to the parameter in a timing library responsive to determining that the delay induced by the first delay inducing circuit meets the timing requirement of the digital integrated design; and
   fabricating a circuit having the first delay inducing circuit, a delay controller, and a sensor operative to monitor a first parameter condition corner.

2. The method of claim 1, wherein the first timing analysis includes a statistical timing analysis.

3. The method of claim 1, wherein the populating the timing library further comprises:
   determining whether all parameter conditions have been processed; and
   loading and processing a second parameter condition corner and populating the timing library using the second parameter condition corner responsive to determining that all parameter conditions have not been processed.

4. The method of claim 1, further comprising controlling the circuit by:
   sensing whether the first parameter condition corner exceeds a threshold level;
   retrieving a delay corresponding to the sensed first parameter condition that exceeds the threshold level; and
   controlling the first delay inducing circuit to induce the delay corresponding to the sensed first parameter condition that exceeds the threshold level.

5. The method of claim 1, further comprising:
   determining whether all parameter conditions have been processed; and ending the population of the timing library responsive to determining that all parameter conditions have been processed.

6. The method of claim 1, wherein the timing library is stored in a memory.

7. A computer program product comprising a non-transitory computer readable storage medium having program instructions embodied therewith, the program instructions executable by a processor to cause the processor to perform a method comprising:

performing a first timing analysis of an integrated digital design;

identifying a critical path in the digital integrated design that is dependent on a parameter;

modifying the digital integrated design by inserting a first delay inducing circuit;

running a second timing analysis on the modified digital integrated design to determine whether a delay induced by the first delay inducing circuit meets a timing requirement of the digital integrated design;

saving the delay induced by the first delay inducing circuit with an association to the first parameter condition corner in the timing library responsive to determining that the delay induced by the first delay inducing circuit meets a timing requirement of the digital integrated design; and controlling a circuit having the first delay inducing circuit, a delay controller, and a sensor operative to monitor the first parameter condition corner.

8. The computer program product of claim 7, wherein the first timing analysis includes a statistical timing analysis.

9. The computer program product of claim 7, wherein the populating the timing library further comprises:

determining whether all parameter conditions have been processed; and loading and processing a second parameter condition corner and populating the timing library using the second parameter condition corner responsive to determining that all parameter conditions have not been processed.

10. The computer program product of claim 7, further comprising:

determining whether all parameter conditions have been processed; and ending the population of the timing library responsive to determining that all parameter conditions have been processed.

11. The computer program product of claim 7, wherein the timing library is stored in a memory.

* * * * *